United States Patent [19]

Gagliani et al.

[11] 4,315,080

[45] Feb. 9, 1982

[54] POLYIMIDES

[75] Inventors: John Gagliani; Raymond Lee, both of San Diego, Calif.

[73] Assignee: International Harvester Company, Chicago, Ill.

[21] Appl. No.: 267,459

[22] Filed: May 27, 1981

Related U.S. Application Data

[60] Division of Ser. No. 254,137, Apr. 14, 1981, which is a continuation-in-part of Ser. No. 186,688, Sep. 12, 1980, abandoned.

[51] Int. Cl.$^3$ .......................... C08J 9/00; C08G 18/16
[52] U.S. Cl. ...................................... 521/189; 521/77; 521/88; 521/185; 528/229; 528/353
[58] Field of Search ................... 521/77, 88, 185, 189; 528/229, 353

[56] References Cited

U.S. PATENT DOCUMENTS

| | | | |
|---|---|---|---|
| Re. 30,213 | 2/1980 | Gagliani et al. | 521/185 |
| 3,518,219 | 6/1970 | Lavin | 521/185 |
| 3,726,834 | 4/1973 | Acle, Jr. | 521/185 |
| 3,966,652 | 6/1976 | Gagliani et al. | 521/185 |
| 4,153,783 | 5/1979 | Gagliani et al. | 521/337 |

*Primary Examiner*—Morton Foelak
*Attorney, Agent, or Firm*—LeBlanc, Nolan, Shur & Nies

[57] ABSTRACT

Terpolyimides prepared from tetracarboxylic acid esters and combinations of heterocyclic, aromatic, and aliphatic diamines and artifacts composed of those terpolymers. Precursors, and methods of converting them to the corresponding terpolymers.

16 Claims, No Drawings

POLYIMIDES

The invention described herein was made in the performance of work under NASA Contract No. NAS9-15484 and is subject to the provisions of Section 305 of the National Aeronautics and Space Act of 1958 (72 Stat. 435; 42 USC 2457).

This application is a division of application Ser. No. 254,137 filed Apr. 14, 1981. Application Ser. No. 254,137 is a continuation-in-part of application Ser. No. 186,668 filed Sept. 12, 1980 (now abandoned).

The present invention relates, in one aspect, to polyimides and, more particularly, to certain novel polyimides which have improved properties by virtue of their being terpolymers derived from tetracarboxylic acids and combinations of heterocyclic, aromatic, and aliphatic diamines.

In other aspects our invention relates to precursors of the just alluded to terpolyimides and their preparation and to the conversion of the precursors to the corresponding terpolymers.

U.S. Pat. No. Re. 30,213 issued Feb. 12, 1980, to John Gagliani et al. for METHOD OF MAKING FOAMED COPOLYIMIDES AND PRODUCTS OBTAINED THEREFROM and U.S. Pat. application Ser. No. 935,378 filed Aug. 12, 1978, by John Gagliani for POLYIMIDES (now U.S. Pat. No. 4,241,193 issued Dec. 23, 1980) disclose hydrolytically stable copolyimide foams which are fire resistant and give off essentially no smoke or toxic fumes when they are heated to degradation temperatures (application Ser. No. 935,378 was copending with application Ser. No. 186,668). Consequently, those foams are useful in aircraft cabins, space vehicles, and land and sea transport and in a variety of other applications where human life or equipment might be endangered by the overheating of conventional, more flammable, smoke-emitting materials. They can be used, in such applications, in fire containing walls and lightweight structures, to protect fuel tanks and heat sensitive systems, and as void filler materials and thermal, cryogenic, electrical and acoustical insulations, for example.

We have now discovered that polyimide foams which are in many ways superior to those identified above can be made without sacrificing the desirable attributes of the latter by adding a third diamine of aliphatic character to the precursor from which the polyimide is made. Typical advantages of such foams are increased flexibility and resiliency, greater fatigue resistance, and improved compression set properties.

Compression set is a measure of the extent to which a foam will take on a permanent set or deformation after having been compressed to a stated fraction of its original thickness for a prolonged period of time. This is important in seating applications, for example; materials which are susceptible to compression set reach the point where tactile comfort becomes unacceptable much sooner than those having good compression set properties.

Generally speaking, then, our novel terpolyimides disclosed herein are prepared from precursors which are solutions of a lower alkyl ester of 3,3',4,4'-benzophenonetetracarboxylic acid or a mixture of such esters, an aromatic diamine which is free of aliphatic moieties, a heterocyclic diamine, and an aliphatic diamine. The imide-forming functionalities (the amino and carboxylic moieties) are preferably present in substantially equimolar amounts.

Exemplary of the aromatic and heterocyclic diamines that can be employed are:
2,6-diaminopyridine
4,4'-diaminodiphenyl sulfone
p,p'-methylene dianiline
4,4'-diaminodiphenyl ether Many other aromatic and heterocyclic diamines have been described in the open and patent literature dealing with the making of polyimides—see, for example, U.S. Pat. Nos. 3,179,614 issued Apr. 20, 1965, to Edwards for POLYAMIDE-ACIDS, COMPOSITIONS THEREOF AND PROCESS FOR THEIR PREPARATION; 3,575,891 issued Apr. 20, 1971, to LeBlanc et al. for STABILIZED POLYIMIDES; and 3,629,180 issued Dec. 21, 1971, to Yoda et al. for PROCESS FOR THE PRODUCTION OF A THERMALLY STABLE POLYMER. Aromatic and heterocyclic diamines selected from those listed in the foregoing patents can be utilized in terpolyimides in accord with the principles of our invention as can others; and we consequently consider our invention to embrace the use of all operable aromatic and heterocyclic diamines.

Aliphatic diamines having from three to 12 carbon atoms have been employed; however, diamines having no more than six carbon atoms will typically prove preferable. The use of those with longer chains can lead to excess thermoplasticity, and that can cause the foam to collapse as it is generated. Also, aliphatic diamines with even numbered chains are preferably employed as they are capable of imparting greater thermal stability to terpolyimides of the character described herein than aliphatic diamines with odd numbered chains.

Aliphatic diamines we have employed include:
1,3-diaminopropane
1,4-diaminobutane
1,6-diaminohexane
1,8-diaminooctane
1,12-diaminododecane and Jeffamine 230. The latter is available from the Jefferson Chemical Company and has the formula:

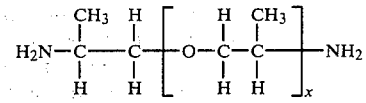

where x is approximately 2.6.

From 0.05 to 0.5 mole of aliphatic diamine per 1.0 mole of benzophenonetetracarboxylic acid can be employed. Concentrations of not more than 0.2 mole per mole of acid are, however, preferred in applications where inflammability is a requirement as the flame resistance of our terpolymers decreases considerably at higher concentrations of the aliphatic diamine.

From 0.05 to 0.9 mole of heterocyclic diamine per mole of acid can be used. Terpolymers with the higher concentration of heterocyclic diamine have the best compression set values and are therefore favored in seat cushioning and other applications of our invention where that property is important.

The precursors of our terpolyimides are essentially monomeric, liquid or solid state solutions of the selected ester (or esters) and diamines.

They are prepared by first reacting 3,3',4,4'-benzophenonetetracarboxylic acid or, preferably, its dianhydride with an esterification agent to form an alkyl diester. Exemplary esterification agents are methyl, ethyl, propyl, and isopropyl alcohols. Methanol is in many cases preferred because of its widespread availability, low cost, and other attributes; because its use facilitates conversion of the precursor to a polyimide foam; and because the foams made from the methyl esters tend to be more flexible, resilient, and compression set resistant. Ethanol is also a preferred esterification agent.

The esterification reaction is followed by the addition of the diamines, which are dissolved in the reaction mixture. The temperature is kept below the reflux temperature of the esterification agent during dissolution of the diamines and low enough to avoid polymerization of the diamines and ester. Graphite, glass, and other fibers, as well as other fillers such as glass microballoons and additives such as crosslinking agents can be added to the resulting composition to impart wanted properties to the final product. A surfactant can also be added to increase fatigue resistance of the terpolyimide foam and to make it more flexible and resilient by increasing the bubble stability of the foam and the uniformity of the cellular structure.

One preferred surfactant is AS-2, a nonionic, fluorinated, polyalkylene copolymer manufactured by E. I. DuPont de Nemours and Company. We have employed from 0.01 to 0.1 percent of this surfactant based on the weight of the ester and diamine constituents. In systems containing 2,6-diamino pyridine and p,p'-methylene dianiline along with the aliphatic diamine and 3,3',4,4'-benzophenonetetracarboxylic acid ester, a concentration of ca. 0.05 percent proved to be optimum.

Another surfactant that has been successfully employed in those systems in concentrations of 0.1 percent is X-3, a nonionic surfactant of the same general chemical composition as AS-2 and manufactured by the same company.

The material existing after dissolution of the diamines and the addition of any additives may range in form from a "liquid resin" to a spreadable, pastelike formulation depending upon the nature and quantity of any fillers added to the resin. The material may be used in the form just described; or it can be transformed into an amorphous powder capable of being converted into a flexible, resilient, terpolyimide foam. Although not essential, it is preferred that spray drying be employed for this purpose because the liquid resin can thereby be transformed on a continuous basis and in one step into a dry powder. Also, spray drying allows for modification of the precursor in ways which can be used to vary the properties of the final product.

One suitable spray drying process is described in copending application Ser. No. 186,670 filed Sept. 12, 1980.

The amphorous, powdered resinoid precursor can be converted to a monolithic, terpolyimide foam by various techniques including dielectric, thermal, and microwave heating. The latter, alone or with a thermal postcure, is preferred because of the speed with which the foam can be generated and cured; because the foam is homogeneously heated; and because handling of the fragile, uncured foam can be avoided.

Microwave techniques and equipment that can be used to foam and cure the precursor are disclosed in copending application Ser. No. 186,629 filed Sept. 12, 1980.

Foaming-curing parameters that have proven satisfactory in converting 100 gram samples of representative precursors to flexible, resilient terpolyimide foams are two to 12 minutes exposure to high frequency radiation in an oven operating at a frequency of 2450 MHZ and at 5 kW power followed by thermal heating at a temperature of 500°–550° F. for 15 minutes to two hours.

The resulting foam can be employed as such—in a seat cushion or as insulation, for example. Or, using the procedure described in application Ser. No. 935,378 as a further example, the flexible, resilient terpolyimide foam can be converted to a dense, rigid, structurally strong, intumescent material by heating it under pressure.

As suggested above, there are also applications in which the precursor can best be utilized in a liquid or semifluid form. One example is the making of wall and floor panels and other rigid components or artifacts. In a typical application of that character, a layer of the liquid resin, compounded with appropriate fillers, is sandwiched between two pieces of glass cloth wetted with the resin. Foaming and curing of the terpolyimide in a typical wet panel thus formed can be effected in much the same manner as the powdered precursors.

The general model for the chemical reactions which are effected in forming the precursor and in converting it to a polyimide are shown below. The actual reactions are much more complex as three amines, rather than the single aromatic amine shown in the model, are involved (i) Esterification:

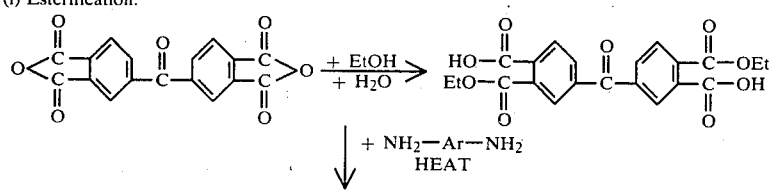

+ NH$_2$—Ar—NH$_2$
HEAT (ii) Amidization:

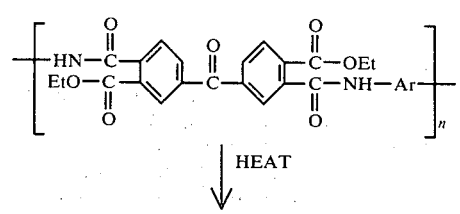

HEAT (iii) Imidization:

-continued

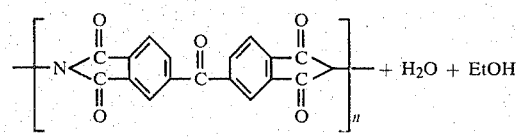

One advantage of our invention, alluded to above, is that advantage can be taken of its principles to provide polyimides which have the attributes of those state-of-the-art copolyimides disclosed in U.S. Pat. No. Re. 30,213 and in application Ser. No. 935,378, and, at the same time, have such additional desirable attributes as a wider range of mechanical properties, greater flexibility and resilience, and greater fatigue resistance and durability.

Also, our novel compositions have the advantage of great versatility; they can, for example, be produced as foams useful for cushioning and in other applications where comfort is important, and as thermal, electrical, and acoustical insulations; and they can, on the other hand, be used in floor and wall panels and in other rigid components. They can also be molded into a wide variety of configurations; and fillers and other additives can be compatibly compounded with them to provide optimal performance in various applications of our invention.

Terpolyimides as described above are unique insofar as we are aware. U.S. Pat. Nos. 3,573,132 issued Mar. 30, 1971, to Ducloux et al. for PROCESS FOR THE PREPARATION OF POLYIMIDES and 4,043,978 issued Aug. 23, 1977, to Schmidt et al. for POLYIMIDES suggest that polyimides can be made from tetracarboxylic acids or anhydrides and aliphatic, aromatic, heterocyclic and other diamines and that mixtures of diamines can be employed. However, there is nothing in either patent which would lead one to the particular combination of aromatic plus heterocyclic and aliphatic diamines we employ or which suggests the relative proportions of diamines needed to take advantage of that combination; and there is nothing in either patent which suggests how a polymer with our particular combinations of diamines could be made or that anything would be gained by making such compositions.

From the foregoing it will be apparent to the reader that one important and primary object of our invention resides in the provision of a new family of polymers which are unique in a variety of respects.

Related and also important but more specific objects of the present invention include:

the provision of polymers and compositions containing them which are fire resistant and which give off little or no smoke or toxic compounds when subjected to high temperature, oxidative degradation;

which are strong and durable;

which, when formulated as foams, have improved flexibility and resiliency, fatigue resistance, and compression set;

which are so versatile that they can be employed for such diverse purposes as cushioning and insulation of different types, in panels and other components requiring rigidity and structural strength, and as molding powders.

Another important and again related object of our invention resides in the provision of novel, improved polymers which are terpolyimides derived from a benzophenonetetracarboxylic acid ester and a combination of aromatic, heterocyclic, and aliphatic diamines.

Still other important and primary objects of the present invention reside in the provision of precursors for the polymers identified above and in the provision of processes for making those polymers and for converting the precursors to the corresponding polymers.

Certain important objects of the present invention have been identified above. Other important objects and advantages and additional novel features of the invention will be apparent to those skilled in the relevant arts from the foregoing general description of the invention; from the appended claims; and from the following examples, which are intended to illustrate and not restrict the scope of the invention.

EXAMPLE I 3,3',4,4'-Benzophenonetetracarboxylic acid dianhydride (BTDA) (322.23 g, 1.0 mole) was added to 240 ml of methyl alcohol and 24 ml of water in a one-liter, three-neck flask equipped with a thermometer, a mechanical stirrer, and a reflux condenser. After addition, the mixture was refluxed until clear. The mixture was then refluxed for an additional 60 minutes to ensure complete reaction of the BTDA to its half (or di-) ester.

The contents of the flask were then cooled to 25°–35° C. (77°–95° F.).

2,6-Diaminopyridine (2,6 DAP) (32.8 g, 0.3 mole) and p,p'-methylene dianiline (MDA) (99.1 g, 0.5 mole) were added to the half ester solution and the contents mixed for 15 minutes.

1,6-Diaminohexane (1,6 DAH) (23.7 g, 0.2 mole) was next added to the mixture. This was done slowly enough that the reaction temperature did not exceed 65° C. (149° F.).

The result was a liquid resin precursor which can be used in that form as discussed above.

In a typical instance involving the formation of a low density, high strength, rigid panel, the liquid resin is compounded with selected fillers in a variable speed mixer until the fillers are thoroughly wetted. Glass cloth wetted with the resin is placed on a sheet of aluminum foil. The resin mixture is spread over the glass cloth and covered with another piece of liquid resin wetted glass cloth. Solvent is removed by drying the wet panel in a microwave oven on a sheet of Teflon coated glass cloth at a power output of 1.25 KW for a period of 3 to 5 minutes.

The dried panel is then foamed and cured. Foaming of the panel can be carried out in the microwave oven at a power output of 5.0 KW for six minutes between two sheets of Pyroceran with the thickness of the panel being controlled by Teflon spacers extending between the sheets. The panels can then be cured in a circulating air oven at a temperature of 287.7° C. (550° F.) for 30 minutes.

EXAMPLE II

In an instance leading to a flexible, resilient foam, a liquid resin as described in Example I and made by the process described in that Example was first compounded with 0.1 weight percent of X-3 surfactant, based on the weight of its ester and amino constituents, and then mixed with a 30 phr (parts per hundred parts of resin) dilution ratio of alcohol. A Niro Mobile spray dryer was heated to an inlet temperature of 100° C. (212° F.) and an outlet temperature of 70° C. (158° F.). The liquid resin was then fed into the dryer with the feed being manually adjusted throughout the operation to keep the dryer outlet temperature in the range of 69°–71° C. (156°–160° F.).

This produced a powder which was collected, sieved through a Tyler 48 mesh (297 microns) sieve, and rolled for 30 minutes in a round plastic bottle.

This powder is, essentially, a solid state solution of unreacted diamines and 3,3',4,4'-benzophenonetetracarboxylic acid diester.

A flexible terpolyimide insulating foam was produced from the powder precursor using a Gerling Moore Batch Cavity Model 4115 microwave oven operating at a frequency of 2450 MHz and a power of 5 KW.

The precursor was spread on a Teflon coated glass cloth substrate and placed in the microwave cavity at room temperature. After two to twelve minutes of exposure to the microwave field, depending upon the particular test being conducted, the powder expanded into a homogeneous, cellular foam block. This block was thermally cured into a flexible and resilient foam by heating it at 260° C. (500° F.) for two hours.

The foam rise, cellular structure, resiliency, density, fatigue resistance, and compression set of the foam were then identified.

Resiliency was determined by the ball rebound method described in ASTM Designation D-1564, Suffix B, using a tester fabricated and calibrated in accord with that procedure.

Compression set of the foam at 90 percent compression was determined according to the same ASTM Designation, Method B, using two steel plates held parallel to each other by clamps. The space between the plates was adjusted to the required thickness by spacers.

The resistance of the foam to cycle shear loadings; i.e., its fatigue resistance, was determined in accord with ASTM Designation D-1564, Procedure B, with the exception that examination and measurement of the foam for loss of thickness was made at 10,000 and 20,000 cycles. The fatigue tester was constructed in accord with the same ASTM Designation.

Performance of the foam was detected qualitatively by looking for embrittlement and degradation of the cellular structure and quantitatively by the ball rebound resiliency method and by weight change.

Other tests involved visual observation of the products for cellular structure, foaming behavior, and imperfections; flame resistance using a Meker burner; and hydrolytic stability.

Numerical and qualitative test results are tabulated below:

TABLE 1

| Density | | 90% Compression Set % Loss After 30 Minute Recovery | Resiliency Ball Rebound | Foam Characteristics |
|---|---|---|---|---|
| lbs/ft³ | kg/m³ | | | |
| 1.44 | 23.0 | 30 | 55 | Flexible, resilient, medium cell size |

The foam resisted the open flame of the Meker burner for up to 20 minutes, and it exhibited almost no change after having been kept at 100 percent relative humidity at 60° C. (140° F.) for 30 days.

EXAMPLE III

To demonstrate that other aliphatic diamines can be employed in the novel family of polymers disclosed herein, the procedure described in Example I was repeated, using a variety of aliphatic diamines. The liquid resins thus obtained were then dried and converted to terpolyimide foams using the procedure described in Example II.

Also, to further illustrate how modifications in the formulation of the precursor can be utilized to control the properties of the terpolyimide, the molar ratios of the aliphatic and heterocyclic diamines to the BTDA ester were varied over a considerable range.

The resulting terpolyimide foams were subjected to the analyses described in Example II. Many of the results are tabulated below, and others are discussed in the narrative following the Table:

TABLE 2

| Foam Resin Number[3] | (Molar Ratios) Aliphatic Diamine[1] | Density | | 90% Compression Set % Loss After 30 Minute Recovery | Resiliency Ball Rebound | Foam Characteristics |
|---|---|---|---|---|---|---|
| | | lbs/ft³ | kg/m³ | | | |
| Copolyimides Group 1 | None (1.0:0.3:0.6:0.1) | 0.538 | 8.6 | 52 | 55 | Flexible, resilient, good structure |
| 1 | Propyl[2] | 1.44 | 23.0 | 46 | 50 | Flexible, resilient, good structure |
| 2 | Butyl | 1.32 | 21.1 | 63 | 45 | Flexible, resilient, good structure |
| 3 | Hexa | 1.36 | 21.8 | 48 | 55 | Flexible, resilient, good structure |
| 4 | Octa | 0.943 | 15.1 | 39 | 50 | Flexible, resilient, striated |
| 5 | Dodeca | 1.62 | 25.9 | 42 | 50 | Flexible, resilient, large cell |
| 6 | Jeffamine D-230 | 1.11 | 17.8 | 21 | 70 | size, brittle |
| Group 2 | (1.0:0.2:0.6:0.2) | | | | | |
| 7 | Propyl | 0.840 | 13.4 | 40 | 40 | Flexible, resilient, good structure |
| 8 | Butyl | 1.25 | 20.0 | 53 | 53 | Flexible, resilient, good structure |
| 9 | Hexa | 0.817 | 13.1 | 47 | 55 | Flexible, resilient, good structure |
| 10 | Octa | 1.40 | 22.4 | 43 | 35 | Flexible, resilient, good structure |
| 11 | Dodeca | 3.32 | 53.0 | 46 | 70 | Flexible, resilient, good structure |
| 12 | Jeffamine D-230 | — | — | — | — | Brittle, very large cell size, poor foam |
| Group 3 | (1.0:0.1:0.6:0.3) | | | | | |
| 13 | Propyl | — | — | — | — | Rigid foam, collapsed and degraded on heating |
| 14 | Butyl | 1.48 | 23.7 | 63 | 50 | Flexible, resilient, fair structure |
| 15 | Hexa | 1.37 | 21.9 | 71 | 50 | Flexible, resilient, fair structure |
| 16 | Octa | 1.33 | 21.2 | 68 | 45 | Flexible, resilient, good structure |

TABLE 2-continued

| Foam Resin Number[3] | (Molar Ratios) Aliphatic Diamine[1] | Density lbs/ft³ | Density kg/m³ | 90% Compression Set % Loss After 30 Minute Recovery | Resiliency Ball Rebound | Foam Characteristics |
|---|---|---|---|---|---|---|
| 17 | Dodeca | 0.778 | 13.5 | 45 | 70 | Flexible, resilient, good structure |
| Group 4 | (1.0:0.3:0.5:0.2) | | | | | |
| 18 | Propyl | 1.33 | 21.2 | 40 | 50 | Flexible, resilient, good structure |
| 19 | Butyl | 0.835 | 13.4 | 25 | 45 | Flexible, resilient, good structure |
| 20 | Octa | 0.845 | 13.5 | 22 | 70 | Flexible, resilient, medium cell size |
| 21 | Hexa | 1.44 | 23.0 | 30 | 55 | Flexible, resilient, medium cell size |
| 22 | Dodeca | 0.565 | 9.04 | 23 | 65 | Flexible, resilient, good structure |
| 23 | Jeffamine D-230 | — | — | — | — | Brittle, very large cell size, collapsed on heating |
| Group 5 | (1.0:0.3:0.4:0.3) | | | | | |
| 24 | Butyl | 1.15 | 18.3 | 31 | 50 | Flexible, resilient, good structure |
| 25 | Hexa | 0.399 | 6.36 | 7 | 55 | Flexible, resilient, highly reticulated |
| Group 6 | (1.0:0.3:0.55:0.15) | | | | | |
| 26 | Hexa | 1.17 | 18.7 | 44 | — | Flexible, resilient, good structure, voids |
| Group 7 | (1.0:0.3:0.65:0.05) | | | | | |
| 27 | Hexa | 1.08 | 17.3 | 31 | — | Flexible, resilient, good structure, voids |

[1] In the order of: 3,3',4,4'-benzophenonetetracarboxylic acid ester; 2,6-diamino pyridine; p,p'-methylene dianiline; aliphatic diamine.
[2] Indication of a radical is used to identify the corresponding aliphatic diamine; e.g., "propyl" = 1,3-diamino propane.
[3] Each resin contained 0.1 weight percent of X-3 surfactant, and methanol was used as the esterification agent.
[4] This entry, provided for comparison purposes, involved a copolyimide foam derived in essentially the same manner as the foams of Groups 1-7 from a precursor having a 1.0:0.3:0.7 molar ratio of 3,3',4,4'-benzophenonetetracarboxylic acid ester; 2,6-diamino pyridine; and p,p'-methylene dianiline.

The Group 1 foams generally exhibited better compression set values and higher density than foams produced from the copolyimide resin with the Jeffamine D-230 giving useable foams with excellent compression set values (when these foams were scaled up to a large size, the quality of the cell structure worsened).

The Group 2 foams were generally comparable in mechanical characteristics to those of Group 1 except that Jeffamine 230 produced foams which exhibited poor characteristics.

Foams of Group 3 produced smoke and continued to burn for 5-15 seconds after removal from the flame. However, these foams were in many respects satisfactory; and they can accordingly be used where flame resistance is not a controlling criteria.

The Group 4 foams had the most homogeneous cellular structure with the exception of foams made with Jeffamine D-230 (Resin 22). A significant advantage of the foams derived from the precursors of Group 4 is the improved compression set.

The densities of these foams are considerably higher than those of the copolyimide foam which is a drawback in applications where weight is at a premium. However, this is offset by increased fatigue resistance.

The Group 5 foams had good structure and excellent compression set properties in one case. However, these foams were found to be less fire resistant than is characteristic of polyimides.

The Group 6 and 7 foams show the effect of varying the concentration of the preferred aliphatic diamine (1,6-diamino hexane). The No. 26 foam was of particular interest. It had considerably decreased fire resistance, indicating that aliphatic diamines concentrations lower than 0.3 mole should be employed in applications where maximum fire resistance is wanted, at least if the aliphatic amine is 1,6-diaminohexane.

EXAMPLE IV

That the properties of our novel terpolyimides can be selectively altered by incorporating a surfactant in the precursor and by varying its concentration is shown by a series of tests conducted as described in Example I and II except that AS-2 surfactant was employed. The surfactant concentration of the 1.0 BTDA ester; 0.3 2,6 DAP:0.5 MDA:0.2 DAH formulation was varied from 0.1 to 1.5 weight percent. The results are tabulated below:

TABLE 3

| Foam No. | Surfactant (AS-2) Concentration Percent | Density Kg/m3 | Density Lbs/ft³ | Indentation Load Deflection (ILD)[1] N 25% | Indentation Load Deflection (ILD)[1] N 65% | Indentation Load Deflection (ILD)[1] Lbs. 25% | Indentation Load Deflection (ILD)[1] Lbs. 65% | Compression Set Loss (Percent) | Resiliency Before Fatigue | After Fatigue (10,000 Cycles) Resiliency | After Fatigue (10,000 Cycles) Height Loss Percent |
|---|---|---|---|---|---|---|---|---|---|---|---|
| 1 | 0.1 | 24.0 | 1.5 | 293.6 | 1427.8 | 66 | 321 | 49 | 50 | 55 | +3.9 |
| 2 | 0.25 | 25.6 | 1.6 | 266.9 | 1352.2 | 60 | 304 | 37 | 45 | 47 | +5.3 |
| 3 | 0.5 | 22.4 | 1.4 | 266.9 | 1165.4 | 60 | 262 | 35 | 40 | 37 | +2.0 |
| 4 | 0.75 | 22.4 | 1.4 | 195.7 | 1009.7 | 44 | 227 | 34 | 40 | 43 | −2.9 |
| 5 | 1.0 | 18.4 | 1.15 | 155.7 | 800.7 | 35 | 180 | 27 | 45 | * | * |
| 6 | 1.5 | 17.0 | 1.06 | 155.7 | 809.5 | 35 | 182 | 27 | 50 | * | * |

*Cellular structure collapsed after fatigue
[1] Performed in accord with ASTM Standard D-1564

EXAMPLE V

We pointed out above that the order in which the diamines are added to the solution of esterified BTDA is an important feature of our invention. This is demonstrated by tests in which the procedures of Examples I and II were followed except for use of the Resin 21 formulation and:

(a) addition of the heterocyclic diamine followed in order by the aromatic and aliphatic diamines at intervals of 15 minutes; and (b) addition of the aromatic diamine followed in order by the heterocyclic and aliphatic diamines at intervals of 15 minutes.

The addition of the diamines was started with the reaction mixture at a temperature of 30°–35° C. (86°–95° F.). The temperature was allowed to increase freely to approximately 50° C. (122° F.) and then controlled by reducing the rate of the addition of the diamines. Finally, the reaction mixture was heated to and maintained at 60°–65° C. (140°–149° F.) for five minutes.

Addition and complete dissolution of the aromatic diamine before the heterocyclic and the aliphatic diamines were added (option b) produced foams with fewer flaws and significantly less foam collapse at the end of the curing cycle.

EXAMPLE VI

Particle size is another parameter that significantly affects the properties of terpolyimide foams prepared in accord with the principles of our invention. This was demonstrated by a series of tests involving a terpolyimide containing diaminohexane.

Various particle sizes were obtained by sieving the powdered precursor through a Tyler mesh screen and by comminuting it in a Pulvette bench model grinder.

All foams were produced by foaming and curing the precursor on Teflon coated glass (type 7267/114) in a 15 kW microwave oven using a powder loading of 15 kg (33 lbs.) at a thickness of 6.35 cm (2.5 inches).

The data resulting from this series of tests is summarized below:

TABLE 4

| Particle Size (Tyler Mesh) | Indentation Load Deflection | | | | Foam Quality |
|---|---|---|---|---|---|
| | 25% | | 65% | | |
| | N | (lbf) | N | (lbf) | |
| #25 | 138 | 39 | 534 | 120 | Good cellular structure |
| #50 | 245 | 55 | 1076 | 242 | Rigid structure |
| Pulverized (maximum size less than 50 microns) | 267 | 60 | 1054 | 237 | Rigid structure, large flaws |

The tabulated data suggests that larger particle size precursors yield more usable foams and a more homogeneous cellular structure with fewer imperfections than foams with a maximum particle size of 50 microns and lower.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and equivalency of the claims are therefore intended to be embraced therein.

What is claimed and desired to be secured by United States Letters Patent is:

1. A terpolyimide foam derived from a precursor comprising an essentially stoichiometric mixture of an alkyl ester of 3,3′,4,4′-benzophenonetetracarboxylic acid or a mixture of such esters and at least three diamines, one of said diamines being heterocyclic, a second of said diamines being aromatic, a third of said diamines being aliphatic, and there being from 0.05 to 0.5 mole of aliphatic diamine and from 0.05 to 0.9 mole of heterocyclic diamine per mole of benzophenonetetracarboxylic acid ester(s).

2. A terpolyimide foam derived from a precursor as defined in claim 1 in which the aliphatic diamine has from three to twelve carbon atoms.

3. A terpolyimide foam derived from a precursor as defined in claim 2 in which the aliphatic diamine has not more than six carbon atoms.

4. A terpolyimide foam derived from a precursor as defined in either of the preceding claim 2 or 3 in which the aliphatic diamine has an even number of carbon atoms.

5. A terpolyimide foam derived from a precursor as defined in claim 1 in which the aliphatic diamine has the formula:

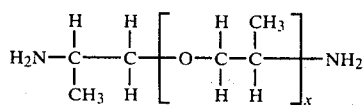

where x is on the order of 2.6.

6. A terpolyimide foam derived from a precursor as defined in claim 1 which includes a surface active agent in an amount effective to improve the bubble stability of and produce a more uniform cellular structure in the terpolyimide foam.

7. A terpolyimide foam derived from a precursor as defined in claim 1 which is a dry powder and which has a maximum particle size of at least 50 microns.

8. A terpolyimide foam derived from a precursor as defined in claim 1 in which any ester present is a methyl or ethyl half ester of 3,3′,4,4′-benzophenonetetracarboxylic acid and the diamines are 2,6-diamino pyridine, p,p′-methylene dianiline, and 1,6-diamino hexane.

9. A terpolyimide foam derived from a precursor as defined in claim 8 in which the molar ratio of the ester and diamine constituents is:

| 3,3′,4,4′-benzophenonetetracarboxylic acid ester(s) | 1.0 |
|---|---|
| 2,6-diamino pyridine | 0.3 |
| p,p′-methylene dianiline | 0.4–0.65 |
| 1,6-diamino hexane | 0.05–0.3. |

10. A terpolyimide foam derived from a precursor as defined in claim 1 which includes a filler intimately admixed with the mixture of diamines and tetracarboxylic acid ester(s).

11. A terpolyimide foam obtained by a process which includes the steps of dissolving a benzophenonetetracarboxylic acid or anhydride in an excess of an alkyl alcohol esterification agent to form a solution of an ester of the acid; adding to and dissolving in said solution in amounts such that the imide forming functionalities are substantially equimolar a heterocyclic diamine, an aromatic diamine, and an aliphatic diamine, there being from 0.05 to 0.5 mole of aliphatic diamine and from 0.05 to 0.9 mole of heterocyclic diamine per mole of 3,3′,4,4′-benzophenonetetracarboxylic acid ester; and heating the resulting material to effect first amidization and then imidization of the material existing after the dissolution of said diamines.

12. A terpolyimide foam obtained by a process as defined in claim 11 in which said aromatic diamine is added first to said solution and in which said aromatic diamine is fully dissolved before said heterocyclic and aliphatic diamines are added.

13. A terpolyimide foam obtained by a process as defined in claim 11 which includes the step of adding to the ester-diamine solution a surfactant in an amount effective to improve the bubble stability of and produce a more homogeneous cellular structure in the terpolyimide foam to which the precursor can be converted.

14. A terpolyimide foam obtained by a process as defined in claim 11 which includes the step of reducing the material existing after the dissolution of the diamines in the esterification agent to a dry particulate form.

15. A terpolyimide foam obtained by a process as defined in claim 11 in which the aromatic diamine is completely dissolved in the material existing after the dissolution of the diamines benzophenonetetracarboxylic acid or anhydride in the esterification agent before the heterocyclic and aliphatic diamines are added to said material.

16. A terpolyimide foam obtained by a process as defined in claim 11 in which the material existing after the dissolution of the diamines in the esterification agent is reduced to a dry particulate form by spray drying.

* * * * *

UNITED STATES PATENT AND TRADEMARK OFFICE
CERTIFICATE OF CORRECTION

PATENT NO. : 4,315,080

DATED : February 9, 1982

INVENTOR(S) : John Gagliani, Raymond Lee

It is certified that error appears in the above-identified patent and that said Letters Patent is hereby corrected as shown below:

Column 12, claim 4, line 2, Change "claim" to -- claims --.

Column 14, claim 15, line 4, delete -- diamines --.

Signed and Sealed this

Twenty-second Day of March 1983

[SEAL]

Attest:

GERALD J. MOSSINGHOFF

*Attesting Officer*  *Commissioner of Patents and Trademarks*